United States Patent [19]

Ledley, III

[11] 4,103,427
[45] Aug. 1, 1978

[54] ELECTRONIC DIGITAL MICROMETER
[75] Inventor: Robert E. Ledley, III, Wilmington, Del.
[73] Assignee: Suntech, Inc., St. Davids, Pa.
[21] Appl. No.: 718,749
[22] Filed: Aug. 30, 1976
[51] Int. Cl.² .................. G01C 03/18; G01C 07/02
[52] U.S. Cl. ................................. 33/166; 33/125 C; 235/92 GC; 250/237 G
[58] Field of Search ............ 33/125 A, 125 C, 143 L, 33/147 N, 164 R, 166, 170, 172 E, DIG. 3; 235/92 V, 92 DN, 92 GC; 250/237 G

[56] References Cited
U.S. PATENT DOCUMENTS

| 3,482,321 | 12/1969 | Inshaw | 33/166 |
| 3,686,766 | 8/1972 | Matumoto | 33/166 |
| 3,877,149 | 4/1975 | Masuda | 33/166 |
| 3,924,336 | 12/1975 | Inoue | 33/164 R |
| 3,924,337 | 12/1975 | Taylor | 33/172 E |
| 4,034,477 | 7/1977 | Von Voros | 33/125 C |

FOREIGN PATENT DOCUMENTS
1,400,293  7/1975  United Kingdom ............ 33/166

Primary Examiner—Richard E. Aegerter
Assistant Examiner—Richard R. Stearns
Attorney, Agent, or Firm—J. Edward Hess; Donald R. Johnson; Stanford M. Back

[57] ABSTRACT

An electronic micrometer having an encoding system located inside the micrometer housing for electronically determining and indicating the measurement made by the micrometer. The encoding system produces pulses in response to rotation of the micrometer thimble by having alternating reflecting and nonreflecting surfaces on the inside of the thimble which reflect pulses of light from a light source to a light sensitive cell. A digital counting circuit is provided for counting the pulses produced by the light sensitive cell and a digital readout for displaying the sum result. A system for sensing the direction of thimble rotation, and conditioning the digital counter to add or subtract pulses, has a light source and light sensitive cell opposite a reflecting surface which is either covered by a nonreflecting surface or uncovered depending upon the direction of rotation of the thimble.

5 Claims, 5 Drawing Figures

ELECTRONIC DIGITAL MICROMETER

BACKGROUND OF THE INVENTION

This invention is related to micrometers and more specifically to electronic micrometers.

The conventional precision micrometer typically comprises a spindle attached to a cylindrical thimble and threadedly mounted in a cylindrical hub. When taking a measurement with the micrometer, the thimble and the spindle are turned relative to the hub and the amount of travel is used as an indication of the measured distance. To read the measurement taken, three readings must be taken. For the first reading, the position of the forward edge of the thimble upon the scale which runs along the hub must be determined. Reference is then made to the thimble calibration lines to determine which one is nearest to a line on the scale on the hub. In most cases, the reading will fall between two calibration lines on the thimble scale. Its exact position between two such calibrations is determined by a third reading, made by determining which of the five lines on the hub is most nearly opposite the calibration line on the thimble scale.

As can easily be seen, more than a glance at the micrometer is required to determine the measurement taken. In industrial use, where lost time can be quite significant, it would be desirable to be able to take micrometer readings instantaneously. In addition, a digital readout indicating the measurement would be highly desirable since the problem of inaccurate determination of the measurement could be minimized.

SUMMARY OF THE INVENTION

In accordance with a preferred embodiment, an electronic digital micrometer is provided which has an encoding system located inside the micrometer housing which is responsive to signals produced when the micrometer thimble is rotated, the signals being related to the longitudinal movement of the micrometer spindle toward or away from the anvil. The signals are produced by having alternating reflecting and nonreflecting surfaces on the inside of the thimble which reflect pulses of light from a light source to a light sensitive cell. A counter circuit adds or subtracts the pulses received from the light sensitive cell. A system for sensing the direction of thimble rotation, and for conditioning the digital counter to add or subtract pulses, has a light source and light sensitive cell opposite a reflecting surface which is either covered by a nonreflecting surface, or uncovered depending upon the direction of rotation of the thimble.

The thimble and the spindle can be mounted in a jackscrew relationship so that the thimble can rotate in place while the spindle moves axially, so as to minimize the size of the micrometer to better enable it to be used in confined spaces.

The digital micrometer is designed to be simple in operation so that a minimum of parts are required to keep the physical size of the micrometer near that of a conventional mechanical micrometer and to reduce manufacturing costs. Use of an appropriate number of reflective and nonreflective surfaces on the inside of the thimble enables the use of a relatively simple digital counter circuit without converting the sum of pulses before the number is displayed on the digital readout.

A better understanding of this invention and its advantages can be seen in the following description of the figures and preferred embodiment.

DESCRIPTION OF THE FIGURES AND PREFERRED EMBODIMENT

Figure 1:
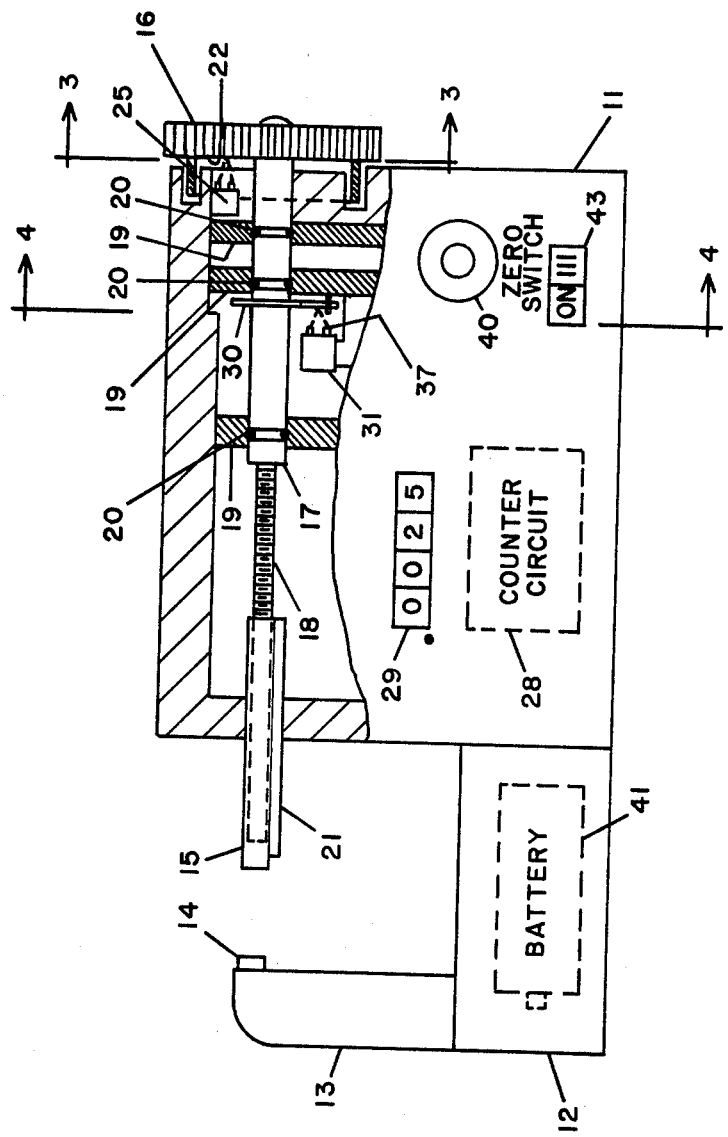
FIG. 1 shows a fragmentary sectional view of the micrometer housing.

Referring to FIG. 1, the digital micrometer has a micrometer housing 11 with a power supply or a battery housing 12 extending from the side of housing 11. A vertical arm 13 extends from the end of battery housing 12 to form a "U" shaped enclosure between itself and the side of housing 11, for providing a space for insertion of the particular object or workpiece to be measured. Located at the top of arm 13 is an anvil plate 14, which serves as a zero point for one end of the workpiece to be placed against for measurement. A spindle 15 is slidably mounted through the side wall of housing 11 so that it can slide towards and away from anvil 14. Movement of spindle 15 is accomplished by rotating thimble 16, which is connected to spindle 15 by a jackscrew arrangement. The jackscrew includes thimble axle 17, which has a threaded section 18 that is threaded into the center portion of spindle 15. Support frame members 19 have appropriate bearings 20 for rotation of axle 17. Spindle 15 has a key slot extension 21 for prevention of its rotation when thimble 16 is rotated, thereby assuring that spindle 15 will move toward or away from anvil 14 when thimble 16 is rotated.

The encoding system provided herein operates in response to the rotation of thimble 16 to produce a reading indicating the distance between anvil 14 and the end of spindle 15. The encoding system is designed to count pulses produced by the rotation of thimble 16 in which light is directed on a surface which has both reflecting and nonreflecting portions, thereby producing pulses when a reflection of light is received by a light sensitive cell.

Figure 3:
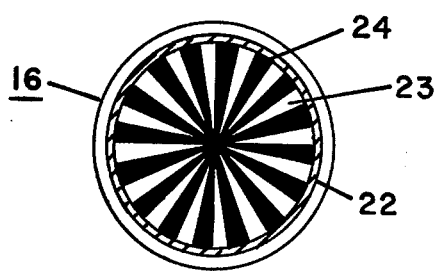
FIG. 3 is a section along the lines 3—3 in FIG. 1, showing the inside face of the thimble.

In the preferred embodiment, this function is accomplished by having pie-shaped sections with alternating reflecting and nonreflecting sections located on the inside surface 22 of thimble 16, as is shown in FIG. 3, with sections 23 being reflective sections and sections 24 being nonreflective sections. A light emitter/sensor unit 25 is secured to the inside of housing 11 in such a fashion that its light emitter 26 continuously provides light at a fixed location and at such an angle that when a reflecting section 23 receives the light, it is reflected to light sensor 27 of the light emitter/sensor 25 (See FIGS. 1 and 5). Light sensor 27 produces a pulse when it senses light, which is sent to counter circuit 28 for counting the number of light pulses detected by light sensor 27. While many different circuits can provide the function of counter circuit 28, a digital counter circuit which is commonly available in the form of a single integrated circuit chip is preferred. A digital display 29 can be provided for displaying the count on counter circuit 28, thereby indicating the distance reading taken by the micrometer.

Figure 4:
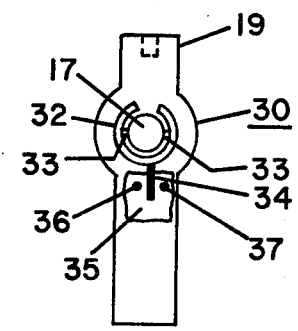
FIG. 4 is a section along the lines 4—4 in FIG. 1 illustrating the sliding switch of the direction sensor system.

Counter circuit 28 should be designed to count upwards and downwards, in response to a conditioning signal indicating the rotation direction of thimble 16. This conditioning signal is provided by a rotation direction sensor system having a sliding switch assembly 30, which is shown in more detail in FIG. 4, and a second light emitter/sensor system 31. Sliding switch 30 includes a circular spring clip 32 rotatably mounted about axle 17 in such a manner that some frictional drag is supplied to the tabs 33 of clip 32. Extending from clip 32 is a downward extending arm 34 having a nonreflective coating on its surface. Located on support member 19, behind arm 34 is a reflective surface 35 and limiting pins 36 and 37. Pin 36 limits the movement of arm 34 in the clockwise direction so that it is located over the point at which the light is being focused by emitter 38. Pin 37 should be located no further away from pin 36 than a distance through an arc equal to two sections of face 22 so that when the rotation direction is changed, the condition of counter 28 is quickly changed.

Figure 5:
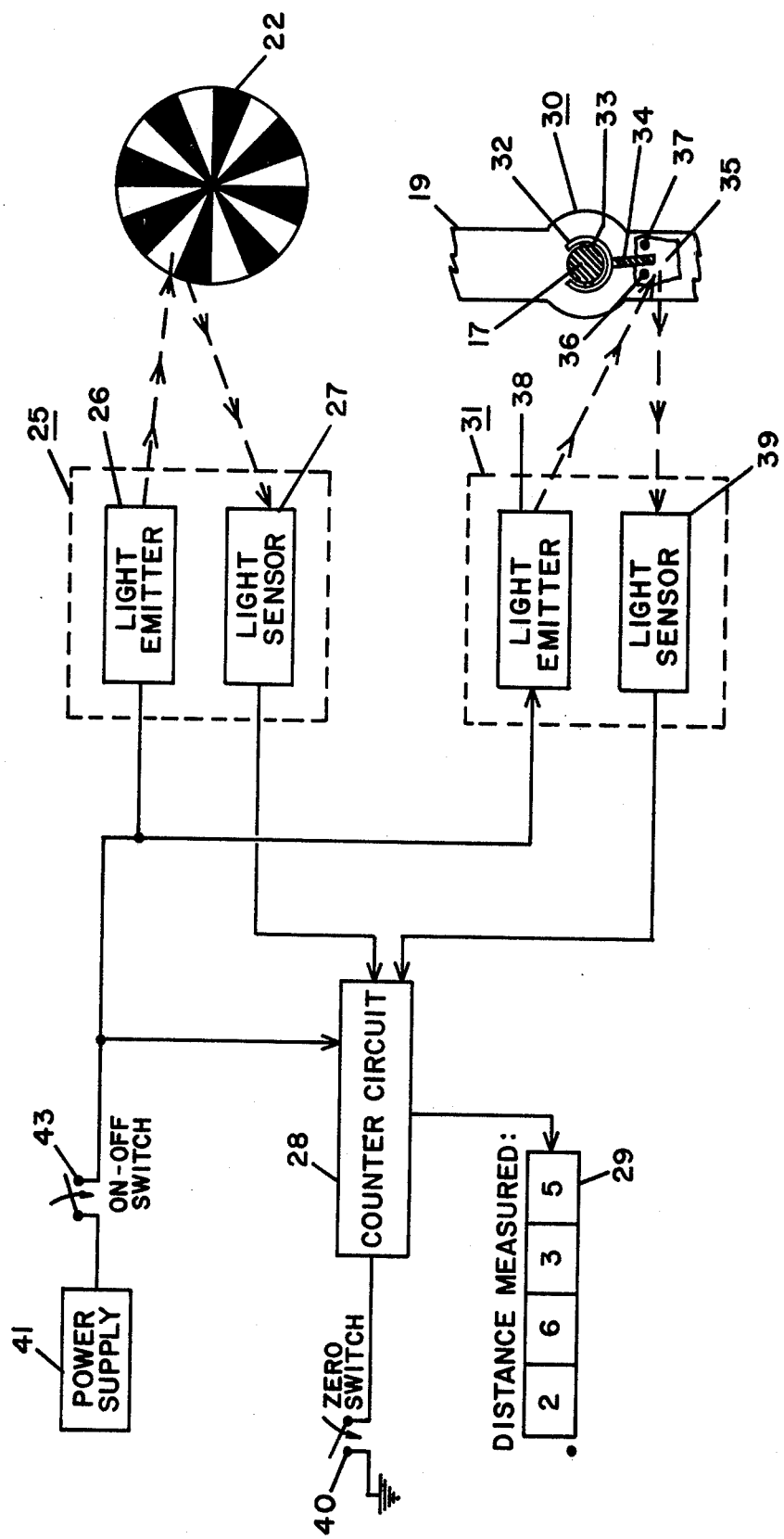
FIG. 5 shows a block diagram of the circuitry of the digital micrometer.

The direction rotation sensing system operates by having light emitter 38 of emitter/sensor 31 focusing the light on one side of the reflective surface between pins 36 and 37, for instance, the left side (see FIG. 5). When thimble 16 and axle 17 are rotated in the counterclockwise direction, arm 34 will be displaced against the right restraining pin 37, leaving the left side of the reflecting surface uncovered to permit reflection of light therefrom. Light sensor 39 receives the reflected light and produces a signal indicating that the axle 17 is rotating in a counterclockwise direction. When the axle 17 is rotated in the opposite or clockwise direction, arm 34 is then urged against left limit pin 36, leaving the right side of reflector surface 35 uncovered. However, since no light is being reflected to light sensor 39, no signal is produced, indicating that axle 17 is rotating in the clockwise direction. Counter circuit 28 is designed to add or subtract pulses from light sensor 27 based on the signal received from light sensor 39, indicating the direction of rotation of thimble 16, and hence, the direction of movement of spindle 15.

For calibrating the micrometer system, a zeroing switch 40 is provided for grounding out counter circuit 28 so that it reads zero on display 29. Preferably, this is to be done when spindle 15 is in position against anvil 14, thereby indicating a zero position for the micrometer.

The micrometer can also be used to determine the difference in the dimensions of two objects. The smallest object is measured first. Counter circuit 28 is then zeroed by pressing zero switch 40. The second object is measured and the value displayed on display 29 indicates the difference in the dimensions.

Figure 2:
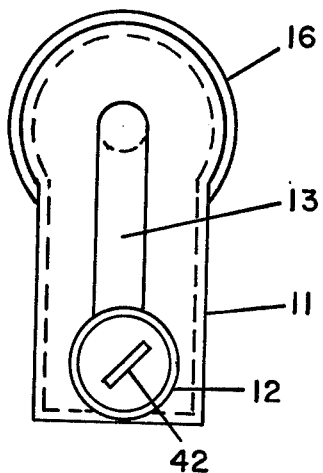
FIG. 2 shows a side view of the micrometer looking from the anvil end of the micrometer.

Power requirements for the circuitry are small enough to enable a small transistor battery to be used. This battery could be easily mounted in micrometer housing 11, as shown in FIG. 1, wherein a battery 41 is secured inside battery housing 12, with a screw cap 42 located at the end (see FIG. 2) for changing batteries.

In operating the micrometer system, after turning on switch 43, the operator would first rotate thimble 16 so that spindle 15 is moved toward and against anvil 14. The operator can then zero the count by pressing zero button 40. Thimble 16 is then rotated in the opposite direction so that spindle 15 is moved away from anvil 14 a distance sufficient to enable the object to be measured to fit therebetween. While this is happening, the light pulses reflected from rotating surface 22 on the back of thimble 16 into light sensor 27, are being counted by counter circuit 28. The rotation direction sensing system indicates that the counter should add the pulses by virtue of sliding switch 30 being in a selected mode for appropriately conditioning counter circuit 28.

When the object to be measured is placed between anvil 14 and spindle 15, thimble 16 is then rotated in the opposite direction so that the object is pressed between spindle 15 and anvil 14 to be measured. When this rotation begins, sliding switch 30 moves to the opposite mode to condition counter circuit 28 so that the pulses from light sensor 27 will be subtracted instead of added. Once spindle 15 is extended against the object to be measured, the reading on display 29 will be the measurement for the distance between anvil 14 and the end of spindle 15.

In order to use a simple digital counter circuit, it is preferable that the thread size on threaded extension 18 of axle 17 be such that spindle 15 will be moved forward 0.0025 inch for every complete rotation of thimble 16. In this manner, the reflective and nonreflective surface 22 of thimble 16 can have 25 reflecting and 25 nonreflecting surfaces. A different set of threads for threaded extension 18 could be used for metric measurements to obtain the same relation.

An example of a light emitter/sensor circuit which could be used in this micrometer is that available from "Fairchild," under the number FPA103 which has a size of 0.24 × 0.185 × 0.18 inch that permits it to easily fit into housing 11. A digital counter circuit which could be used for counter 28 is that also available from "Fairchild" under the number 9360/74192, which has a size of 1.0 × 0.5 × 0.3 inches which permits it to easily fit into housing 11.

While a particular embodiment of this invention has been shown and described, it is obvious that changes and modifications can be made without departing from the true spirit and scope of the invention. It is the intention of the appended claims to cover such changes and modifications.

The invention claimed is:

1. A micrometer having electronic means for determining the measurement of an object taken by the micrometer, said micrometer comprising:
    (a) a micrometer housing, said housing having a side extension with an upward extending arm, forming a "U" shaped enclosure between the side of said housing and the upward extending arm;
    (b) an anvil mounted on the inside edge of the upright extending arm;
    (c) a spindle, slidably mounted by means to prevent its rotation through the micrometer housing so that it may be moved into contact with and away from said anvil, with the object to be measured being placed between the anvil and the spindle;
    (d) a thimble, rotatably mounted on said housing;
    (e) means for connecting the thimble to the spindle so that rotation of the thimble causes the spindle to move toward or away from the anvil;
    (f) means for producing a first signal related to the amount of movement of the spindle toward or away from the anvil, wherein said first signal producing means includes,
        (i) a light source,
        (ii) light sensitive means for producing the first signal when light is sensed, and (iii) means for reflecting pulses of light from the light source to the light sensitive means, the number of reflected pulses being related to the distance the spindle is moved;

(g) means for producing a second signal indicating the direction the spindle is moving, said second signal having a first value for movement of the spindle away from the anvil and a second value for movement of the spindle toward the anvil;

(h) a counter means, responsive to the second signal producing means for adding the first signals when the second signal has its first value, and for subtracting the first signals when the second signals has its second valve;

(i) means for displaying the number of signals counted by said counting means wherein the second signal producing means (g) comprises:

(i) means, responsive to the rotation of the thimble for producing a light absorbing surface at a predetermined point when the thimble is rotated in one direction, and for providing a light reflective surface at said predetermined point when the thimble is rotated in the opposite direction;

(ii) light source means for supplying light at this predetermined point; and, (iii) means for sensing a presence of light at the predetermined point and for producing a signal related to the amount of light at the predetermined point, for receipt by the counter means.

2. The electronic micrometer recited in claim 1, wherein the predetermined point is normally either light absorbing or light reflecting and the means responsive to thimble rotation comprises:

(a) spring clip means rotatably mounted about the connecting means and having an arm with a surface of the opposite light reflectively characteristic of the predetermined point; and (b) means located on either side of the predetermined point so that rotation of the thimble and connecting means in one direction causes the arm of the clip to be centered over the predetermined point, and rotation of the thimble in the opposite direction causes the arm of the clip to be displaced immediately next to the predetermined point.

3. The electronic micrometer recited in claim 2, wherein the light source and said light sensitive means are secured to the micrometer housing and the spindle has an internally threaded section and wherein the connecting means comprises:

(a) axle means connected to the thimble, said axle means having an externally threaded end which is threaded into the threaded section of the spindle; and (b) means for rotatably mounting said axle means in the micrometer housing, so that longitudinal movement of the axle means is prevented, thereby enabling the spindle to move longitudinally for a rotational movement of the thimble.

4. The electronic micrometer recited in claim 1, wherein the reflecting means comprises a disc mounted to rotate with the thimble, said disc having a face with alternating light reflecting and light absorbing surfaces so that when light is emitted on said disc at a predetermined point, rotation of the thimble and disc causes the light to be alternately absorbed and reflected.

5. The electronic micrometer recited in claim 4, wherein the disc having light reflecting and light absorbing sections is located on the inside surface of the thimble.

* * * * *